United States Patent
Cai et al.

(10) Patent No.: US 9,413,489 B2
(45) Date of Patent: Aug. 9, 2016

(54) METHOD AND SYSTEM FOR DATA-DRIVEN, VARIABLE-RATE, CHANNEL QUALITY INDICATOR FOR LTE NON-REAL-TIME BURSTY TRAFFIC

(75) Inventors: Zhijun Cai, Euless, TX (US); James Earl Womack, Bedford, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 2046 days.

(21) Appl. No.: 11/741,590

(22) Filed: Apr. 27, 2007

(65) Prior Publication Data

US 2008/0267302 A1 Oct. 30, 2008

(51) Int. Cl.
*H04L 1/00* (2006.01)
*H04W 52/02* (2009.01)
*H04W 88/02* (2009.01)
*H04L 27/26* (2006.01)

(52) U.S. Cl.
CPC ............ *H04L 1/0027* (2013.01); *H04L 1/0003* (2013.01); *H04L 1/0009* (2013.01); *H04L 1/0026* (2013.01); *H04L 27/2601* (2013.01); *H04W 52/0232* (2013.01); *H04W 88/02* (2013.01); *Y02B 60/43* (2013.01)

(58) Field of Classification Search
USPC ......... 370/331, 445, 458, 459, 229–235, 335; 709/224–226
See application file for complete search history.

(56) References Cited

U.S. PATENT DOCUMENTS

| | | | | |
|---|---|---|---|---|
| 2003/0087605 A1* | 5/2003 | Das et al. | .................... | 455/67.1 |
| 2003/0157953 A1* | 8/2003 | Das et al. | .................... | 455/522 |
| 2005/0174982 A1* | 8/2005 | Uehara et al. | ................. | 370/345 |
| 2005/0207367 A1 | 9/2005 | Onggosanusi et al. | | |
| 2005/0289256 A1 | 12/2005 | Cudak et al. | | |
| 2006/0146856 A1 | 7/2006 | Jung et al. | | |
| 2006/0148411 A1 | 7/2006 | Cho et al. | | |
| 2007/0030828 A1* | 2/2007 | Vimpari et al. | ............... | 370/335 |
| 2007/0047502 A1* | 3/2007 | Marinier et al. | ............. | 370/335 |
| 2007/0220151 A1* | 9/2007 | Li et al. | ......................... | 709/226 |
| 2007/0297373 A1* | 12/2007 | Saifullah et al. | ...... | H04W 48/18 370/338 |
| 2008/0057969 A1* | 3/2008 | Agami et al. | ................. | 455/450 |
| 2008/0080469 A1* | 4/2008 | Kolding et al. | ........ | H04B 17/24 370/342 |
| 2010/0113054 A1* | 5/2010 | Iwamura et al. | ...... | H04L 1/0026 455/452.1 |

FOREIGN PATENT DOCUMENTS

| | | |
|---|---|---|
| EP | 1 309 121 A1 | 5/2003 |
| EP | 1422856 A1 | 5/2004 |
| EP | 1437854 A2 | 7/2004 |
| EP | 1 487 144 A1 | 12/2004 |

(Continued)

OTHER PUBLICATIONS

Lucent Technologies, "Variable Rate Channel Quality Indication in HSDPA" 3GPP TSG-RAN WG1#22, JeJu, Korea, Nov. 19-23, 2001, Document R1-01-1037.

(Continued)

*Primary Examiner* — Gary Mui (74) *Attorney, Agent, or Firm* — Fish & Richardson P.C.

(57) ABSTRACT

A method and system, in a long term evolution architecture utilizing adaptive modulation and coding requiring periodic channel quality indication reports, the method having the steps of: waiting for an idle channel indication; and upon detection of the idle channel indication, decreasing the rate of periodic channel quality indication reports.

14 Claims, 7 Drawing Sheets

(56) References Cited

FOREIGN PATENT DOCUMENTS

WO 03094363 A2 11/2003
WO 2004/073200 A1 8/2004

OTHER PUBLICATIONS

Written Opinion of the International Searching Authority for corresponding International Application No. PCT/CA2008/000755 dated Aug. 6, 2008.
International Preliminary Report on Patentability for corresponding International Application No. PCT/CA2008/000755 dated Sep. 11, 2009.
Exam report for European Application No. 07 107 363.9-2415.
EP Patent Application No. 11161391.5, European Search Report, Jun. 20, 2011.
Philips: "Control of CQI feedback signalling in E-UTRA", 3GPP; TSG Radio Access Network; Working Group 2, XX, XX, No. R1-071093, Feb. 12, 2007, pp. 1-3, XP003023446, Sections 1, 2, 2.2a, 3 and 4.
"Comparison of Channel Quality Reporting Schemes", 3GPP; TSG Radio Access Network; Working Group 2, XX, XX, No. R1-02-0152, Jan. 8, 2002, pp. 1-5, XP002353929, Sections 1, 2.2 and 2.4.
Interdigital: "Scheduling and Multiplexing of CQI and ACK/NACK Feedback for Single Carrier FDMA in Evolved UTRA Uplink", 3GPP TSG-RAN WG1 Meeting Ad Hoc LTE, XX, XX, No. R1-060155, Jan. 23, 2006, p. 1-8, XP002446639, sections 2, 2.1 and 9.1.2.2.1.1.
Benq Mobile: "Dynamic control of CQI reporting", 3GPP; TSG Radio Access Network; Working Group 2, XX, XX, vol. R2-062448, Aug. 28, 2006, p. 1-5, XP003023574, Sections 1, 2.1, 2.2 and 2.3.
EP Patent Application No. 11161391.5, Extended European Search Report, Sep. 20, 2011.
Soo-Yong Jeon et al: "Channel Adaptive CQI reporting Schemes for HSDPA Systems", IEEE Communications Letters, IEEE Service Center, Piscataway, NJ, US, vol. 10 No. 6, Jun. 1, 2006, pp. 459-461, XP001546973, ISSN: 1089-7798, DOI: 10.1109/LCOMM.2006. 1638615. See II. 3GPP-Specified CQI reporting schemes; III. Proposed CQI reporting schemes.

* cited by examiner

METHOD AND SYSTEM FOR DATA-DRIVEN, VARIABLE-RATE, CHANNEL QUALITY INDICATOR FOR LTE NON-REAL-TIME BURSTY TRAFFIC

FIELD OF THE DISCLOSURE

The present disclosure relates to user equipment in a long term evolution (LTE) architecture, and in particular, to transmission of channel quality indications (CQI) in LTE.

BACKGROUND

In a long term evolution architecture, one technology being utilized is adaptive modulation and coding (AMC). AMC allows the modulation scheme and coding to be changed on a per-user basis depending on signal quality and cell usage.

To facilitate AMC operations, in LTE, the user equipment (UE) is required to periodically report the channel quality indication (CQI), for example every two milliseconds. The CQI feedback for AMC incurs significant overhead to both the uplink channel and the UE's battery power due to the continuous CQI transmission.

Further, data traffic is often bursty and a UE could be idle for a significant portion of time for which during which CQI feedback is ongoing.

BRIEF DESCRIPTION OF THE DRAWINGS

The present disclosure will be better understood with reference to the drawings in which.

DETAILED DESCRIPTION

The present disclosure relates to the reduction of CQI feedback impact to the UE's battery power and in one embodiment to the uplink channel. In particular, since most internet IP traffic has bursty characteristics, during the time that there is no data for transmission, the AMC does not need to be used and CQI transmission is not necessary.

In a first embodiment, a UE centric solution is presented in which the CQI transmissions are reduced automatically if the UE determines that there is no traffic for a certain time. In this embodiment, the uplink orthogonal frequency division multiplexing (OFDM) resources still reserved for the uplink CQI transmission at the predefined periodic interval, but the UE simply enters discontinuous transmit (DTX) for certain CQI feedback slots, which can save the UE's battery power. This can be implemented in several ways.

In one embodiment, a binary exponential algorithm can be applied. In particular, a threshold idle period (TIP) T can be set. If the UE determines that the measured idle period is greater than or equal to the threshold T, the CQI reporting rate can be reduced by half. Similarly, if the measured idle period is >=2 T, the CQI reporting can be reduced by one-quarter and so on.

In a second embodiment to the above, it is also possible for the UE to indicate to ENB concerning the reduced CQI reporting rate by some indication field, including a reservation field or an empty field, among others.

Further, full CQI information transmission may require 31 stages with 5 bits. In some cases, only partial CQI information may be needed at the reduced transmission rate. The reason for this is that the overall channel accuracy is already reduced by the reduced reporting rate.

Moreover, if a high layer, such as an application layer, can provide any information about the ending of a particular data session, indicating an idle period may come, the UE can decide to reduce the CQI reporting rate immediately rather than waiting for a threshold time to elapse.

In an alternative embodiment, an enhanced node B centric solution is presented in which the enhanced node B can determine, based on the buffer status of the eNB, to reduce CQI feedback from the UE. The eNB can determine a new CQI reporting rate and format, and signal this to the UE using in-band media access control (MAC) signaling. The UE can apply the new CQI reporting criteria to reduce the uplink feedback transmission as well as saving the UE's battery power. As will be appreciated by those skilled in the art, the uplink OFDM resource is also released for the user's uplink use.

Recovery of CQI reporting for the above embodiments depends on whether the UE centric or the eNB centric solution is being utilized. In both cases a recovery procedure preferably involves the eNB choosing the most conservative modulation coding scheme (MCS) or the MCS based on the latest CQI information for the transmission of data.

In the UE centric solution, the UE can recover by immediately starting full rate CQI transmission upon receipt of the first data packets. Since the OFDM resource is already reserved for CQI transmission, the recovery delay is negligible.

In the eNB centric solution, in-band MAC layer signaling could be used to notify the UE about CQI reporting recovery. The rate can be dependent on the amount of data at the eNB that needs to be transmitted to the UE.

The present disclosure therefore provides a method, in a long term evolution architecture utilizing adaptive modulation and coding requiring periodic channel quality indication reports, the method comprising the steps of: waiting for an idle channel indication; and upon detection of the idle channel indication, decreasing the rate of periodic channel quality indication reports.

The present disclosure further provides a user equipment for use in a long term evolution architecture utilizing adaptive modulation and coding requiring periodic channel quality indication reports, the user equipment characterized by: means for waiting for an idle channel indication; and means for decreasing the rate of periodic channel quality indication reports upon detection of the idle channel indication.

The present disclosure further provides an enhanced node B for use in a long term evolution architecture utilizing adaptive modulation and coding requiring periodic channel quality indication reports, the enhanced node B characterized by: means for waiting for an idle channel indication; and means for signaling a decrease in the rate of periodic channel quality indication reports upon detection of the idle channel indication.

Unnecessary CQI reporting can be a drain on the battery resources of a UE and consume capacity at the air interface and network resources. In particular, for high speed downlink packet access (HSDPA), the high speed dedicated physical control channel (HS-DPCCH) carries uplink feedback signaling related to downlink high speed downlink shared channel (HS-DSCH) transmission. The HS-DSCH related feedback signaling consists of hybrid-automatic request acknowledgement (HARQ-ACK) and channel quality indication (CQI). Each sub frame of length two milliseconds consists of three slots, each length 2,560 chips. The HARQ-ACK is carried on the first slot of the HS-DPCCH sub frame. The CQI is carried on the second and third slot of the HS-DPCCH sub frame. Each slot can carry ten coded bits. The channel quality information is coded using a (20,5). The CQI values 0 to 30 are converted from decimal to binary to map then to the channel quality information bits (1 0 0 0 0) to (1 1 1 1 1) respectively. The HS-DPCCH physical channel mapping function maps the input bits directly to the physical channel so that bits are transmitted over the air in ascending order. This presents significant cumulative transmission costs from a battery and network perspective.

UE Centric Approach

Figure 1:
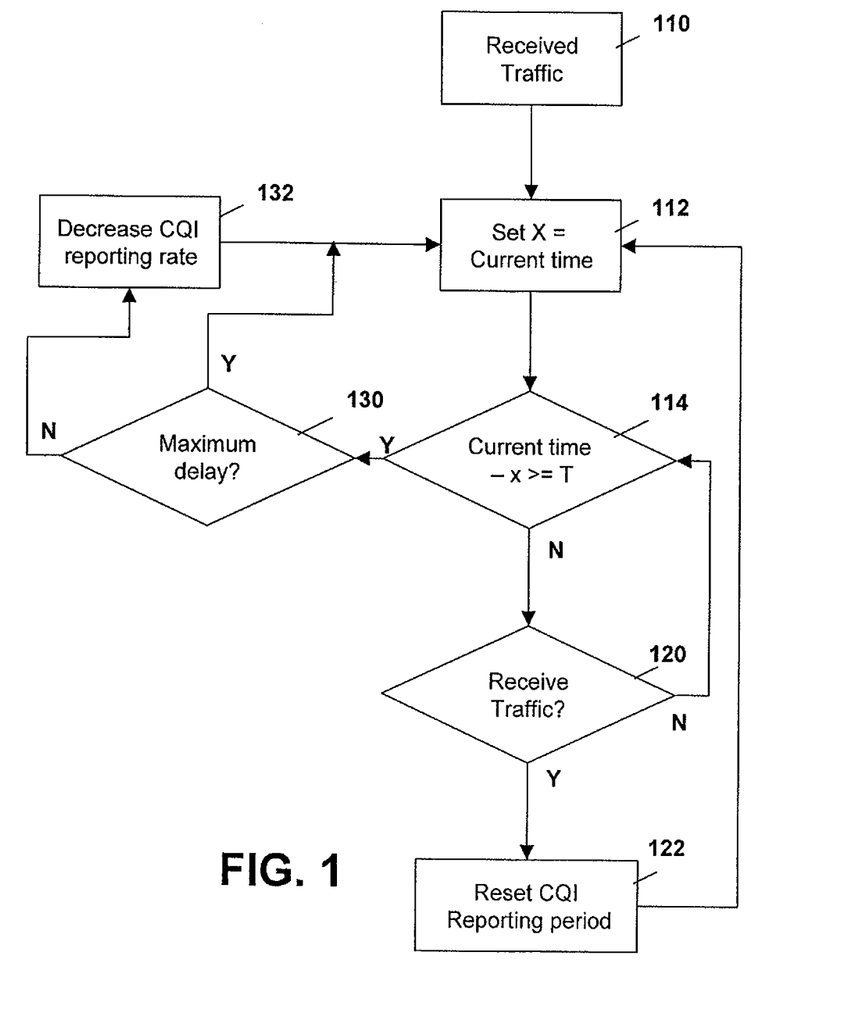
FIG. 1 is a flow diagram illustrating a UE centric method for decreased CQI reporting rates during idle periods.

Reference is now made to FIG. 1. FIG. 1 illustrates a flow diagram of a method for a UE centric solution based on the idle period determination.

Once a UE has received traffic in step 110, the process proceeds to step 112 in which a variable "X" is set to the current time.

The process then proceeds to step 114 in which a check is made to determine whether the current time minus X is greater than or equal to a threshold. As will be appreciated by those skilled in the art, the threshold is predetermined and the check of step 114 will determine whether the threshold time has elapsed since the UE last received traffic.

If, in step 114, the process determines that the threshold time has not elapsed, the process proceeds to step 120 in which the process checks whether the UE has received traffic. If not, the process proceeds back to step 114 and continues to check whether the threshold time has been exceeded or the UE has received traffic.

From step 120, if the UE receives traffic, then the process proceeds to step 122 in which the CQI reporting period is reset to the full CQI response rate value to ensure that the AMC has sufficient information to make a determination about the MCS.

If, in step 114, the threshold time has been exceeded, the process proceeds to step 130 in which it checks to see whether or not the delay between CQI reporting intervals has reached a maximum. As will be appreciated by those skilled in the art, it is undesirable to continue decreasing the CQI reporting period indefinitely and thus a maximum CQI delay between reporting intervals can be set.

If, in step 130, the process determines that the maximum CQI reporting delay has not yet been reached, the process proceeds to step 132 in which the CQI reporting period is decreased. The process then proceeds back to step 112 in which the variable X is set to the current time.

Conversely, from step 130, if the maximum CQI reporting period has been reached, the process proceeds directly to step 112 and skips step 132. In this way, the CQI reporting delay is not incremented beyond the maximum delay.

As will be appreciated by those skilled in the art, the process of FIG. 1 is exemplary of a method to decrease the reporting rate of the CQI periodically in order to save resources such as battery power on the UE. The method is not meant to be limiting.

The method of FIG. 1 allows the CQI reporting period to be incremented periodically. Specifically, each time the threshold T is exceeded, the CQI reporting rate is decreased to a maximum delay between CQI reporting intervals.

In one embodiment, the ratio of the reporting period can be inversely proportional to the threshold T. Thus, when the idle period is greater than or equal to T, the CQI reporting rate is reduced by half. If the measured idle period is greater than or equal to 2 T, the reporting rate is reduced by ¼, if the measured idle period is greater than or equal to 3 T the reporting rate is reduced by ⅛, and so on.

By reducing the CQI reporting rate as above, the UE can save battery resources. Specifically, the UE does not need to transmit at the preset reporting rate for standard AMC operation. Instead, the UE becomes DTX during the time slots between the determined CQI reporting rate, and thus saves the UE's battery power. Thus, in full rate reporting the CQI report would be sent in the first reporting interval, the second reporting interval, the third reporting interval, and so on. If the CQI reporting rate is reduced by half, then the CQI report would be sent in the first interval, the third interval, the fifth interval, and so on. Previous reports that would have been sent at the second, fourth, sixth, etc., intervals would not be sent.

The eNB determines the CQI transmission from the UE via blind detection. It is also possible for the UE to indicate to the UE about the reduced CQI reporting rate by some indication field. For example, a reservation field or an empty field in the MAC header could be used for the CQI reporting to indicate that the reporting rate has been decreased. As will be appreciated by those skilled in the art, this could be implemented, for example, in step 132 of the process of FIG. 1, where step 132 would, in addition to decreasing the CQI reporting rate, provide a indication to the eNB of the new reporting rate.

In addition, step 132 could also be used to change the amount of CQI information that the UE is required to report. In particular, if transitioning to reduced rate CQI reporting, only partial CQI information may be needed. As will be appreciated, it is unnecessary in most cases to continue sending full CQI at the reduced rate, since the overall channel accuracy is already reduced by the reduced reporting rate. Thus, for example, instead of a 31 stage with 5 bits report, the CQI could be 8 stage with 3 bits. This also saves battery life and network resources.

Figure 2:
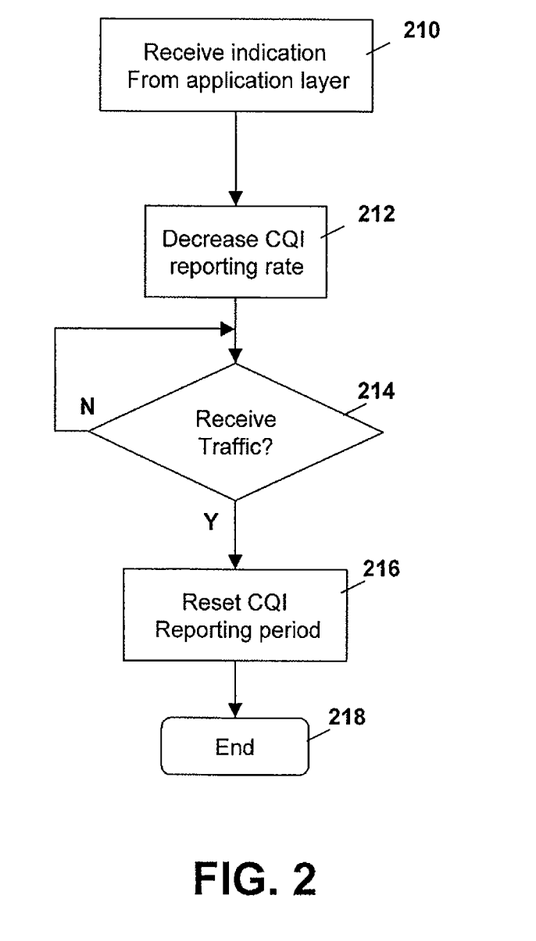
FIG. 2 is a flow diagram illustrating a UE centric method for decreased CQI reporting based on a high layer indication.

Reference is now made to FIG. 2.

FIG. 2 illustrates a flow chart for an alternative UE centric solution. In the embodiment of FIG. 2, the process begins at step 210 through the reception of an indication from a higher layer such as the application layer that a particular data session has ended. This may occur, for example, when a web page has been fully downloaded, and the browser application is aware of this.

The process then proceeds to step 212 in which a CQI reporting rate is decreased immediately. As will be appreciated by those skilled in the art, since the data session has ended, the UE can assume that an idle period is to come and the process can thus immediately change the CQI reporting rate rather than waiting for idle thresholds as in FIG. 1.

The process then proceeds to step 214 in which it checks to see whether data has been received. If no, the process continues to loop in step 214 until data is received. Once data is received in step 214, the process proceeds to step 216 in which the CQI reporting rate is reset to the full CQI reporting rate and the process then ends at step 218.

Figure 3:
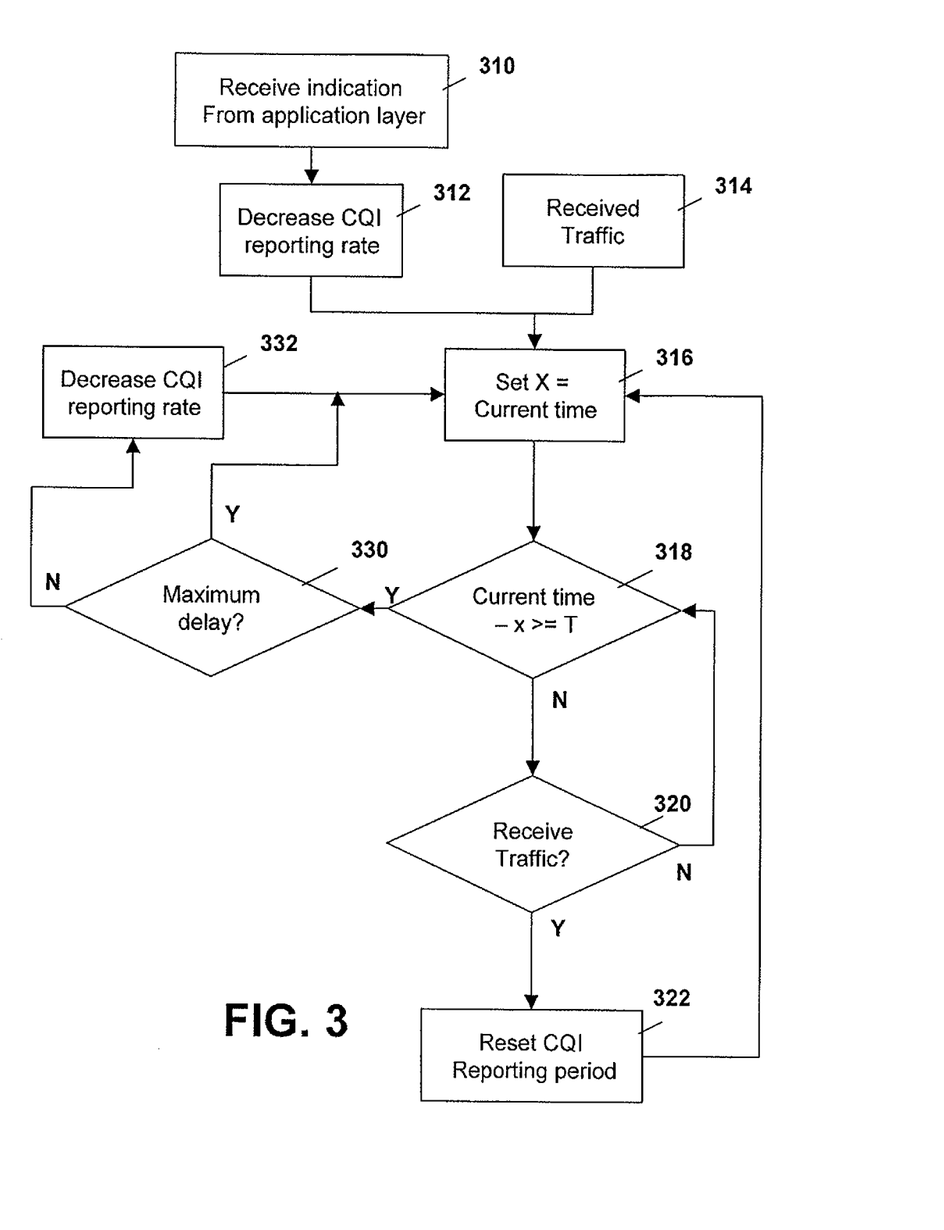
FIG. 3 is a flow diagram illustrating a combination of the UE centric methods of FIG. 1 and FIG. 2.

Further, a combination of the embodiments of FIG. 1 and FIG. 2 could also be utilized. Referring to FIG. 3, a signal is received from a higher layer that a data session has ended in step 310 and the process proceeds to step 312 in which the CQI reporting rate is immediately decreased.

From step 312, the process proceeds to step 316, which is equivalent to step 112 of FIG. 1. In this way, the initial indication from the higher layer that the data session has ended results in an immediate decrease in the CQI reporting rate. Subsequently, if no data is received, the CQI reporting rate can be further decreased through the process of FIG. 1, as illustrated in FIG. 3 where the process checks at step 318 whether the threshold has been exceeded, and if yes, and if the maximum delay between CQI reports has not been reached in step 330, then the CQI reporting rate can be decreased in step 332.

Step 316 can also be reached from step 314 in which traffic has been received. Thus, in the embodiment of FIG. 3, the CQI reporting rate can be decreased through one or both of an idle period for a threshold time and/or a report from a higher layer such as the application layer.

From step 318, if the threshold has not been exceeded, the process proceeds to step 320 to check whether or not new traffic has been received, and if yes, the process proceeds to step 322 in which the CQI reporting period is reset to the full reporting rate and the process proceeds back to step 316.

Recovery

As indicated in FIGS. 1, 2 and 3, steps 122, 216 and 322 provide for the step of resetting the CQI to its full CQI transmission rate. As will be appreciated, the UE determines the idle period by itself and without any signaling involvement. This can be through the lack of receipt of data for a time period or from a message from a higher layer on the UE.

The resources for full rate CQI reporting on the network are unchanged by the methods of FIGS. 1, 2 and 3. Thus the UE can adjust the CQI transmission by itself and when new traffic activity occurs from the eNB, the UE automatically enters the full rate and full CQI transmission to help the AMC. This reduces associated signaling overhead and the recovery delay is negligible since the uplink with the OFDM resource is still reserved.

From the eNB perspective, since the eNB has not been receiving the CQI at the normal reporting rate, if new data arrives, the eNB chooses the most conservative modulation coding scheme (MCS) for the transmission to the UE based on the latest received CQI information. After the UE receives the first data packets, the UE immediately starts the full rate CQI transmission on the uplink as indicated in steps 122, 216 and 322 of FIGS. 1, 2 and 3 respectively. This allows the MCS to be adjusted by the eNB.

ENB Centric Solution

Figure 4:
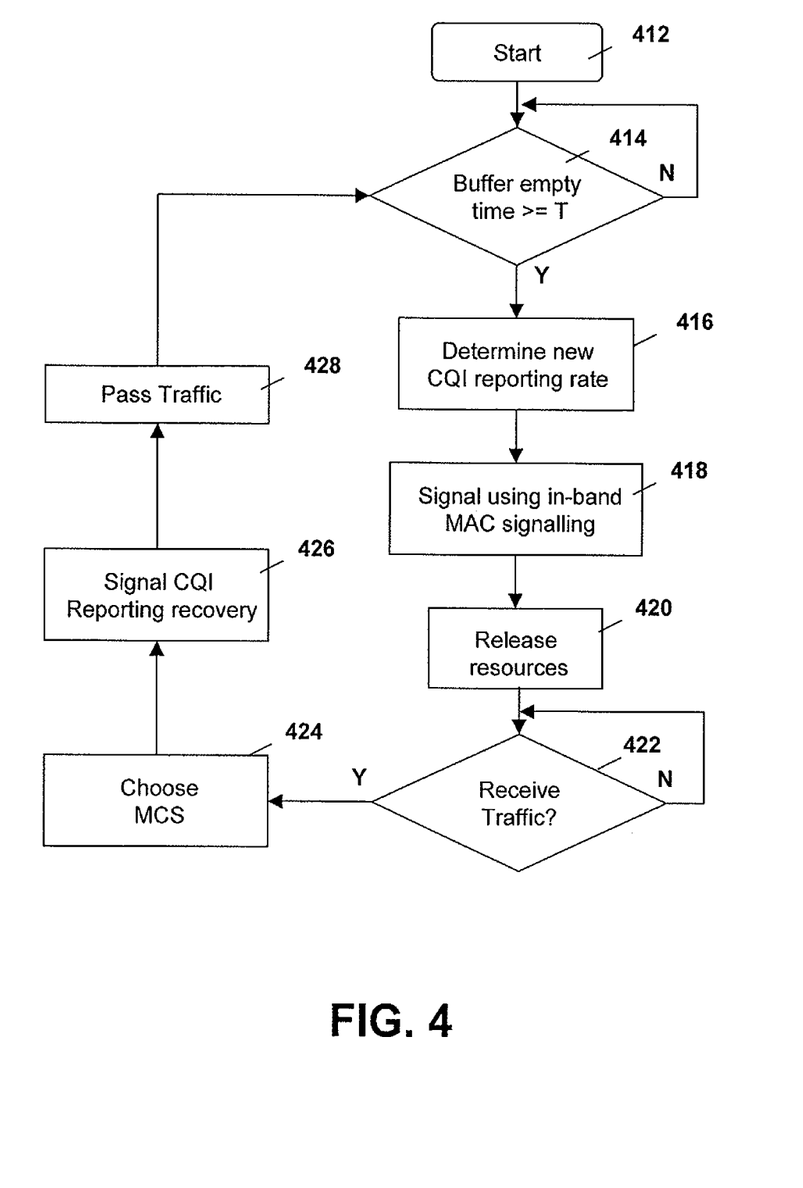
FIG. 4 is a flow diagram illustrating an ENB centric method for decreased CQI reporting during idle periods.

Reference is now made to FIG. 4. For an eNB centric solution, the eNB checks its buffer status for data for a particular UE. Specifically, the process starts at step 412 and proceeds to step 414 in which the process checks whether the time that the buffer has been empty exceeds a threshold time. If no, the process continues to check step 414 until the buffer empty time exceeds the threshold. As will be appreciated, this time can be reset if new traffic arrives.

Once the buffer empty time exceeds the predetermined threshold, the process proceeds to step 416 in which the eNB determines a new CQI reporting rate. As with the UE centric solution, a reduced CQI reporting rate could also correspond with only partial CQI information being required.

The process then proceeds to step 418 in which the new CQI reporting rate is signaled to a UE with in-band MAC signaling. This signaling could also include the required CQI information to be sent.

The process then proceeds to step 420 in which the OFDM resource is released for the CQI periods that are no longer being used. Specifically, if the CQI was being reported every 2 milliseconds and has now been changed to every 4 milliseconds, the OFDM resource for every second CQI report can now be released.

The process then proceeds to step 422 in which it checks to see whether or not traffic has been received by the buffer on the eNB for the particular UE. If no, the process proceeds back to step 422 and waits until traffic is received. Once traffic is received, the process proceeds to step 424.

Recovery

Once data is received, the eNB chooses a MCS for the transmission In step 424. The eNB will typically choose the most conservative MCS for transmission based on the latest CQI information.

The process then proceeds to step 426 in which the CQI recovery is reported to the UE. The eNB could use in-band MAC layer signaling to notify the UE about the CQI reporting recovery.

Further, recovery does not necessarily require the CQI reporting to be restored to full rate and full information levels. For example, if the UE is currently at a ¼ rate, 3 bit CQI transmission, if the eNB determines that there is only a small amount of data in the buffer, the eNB may notify the UE to use a half rate 5 bit CQI reporting. Conversely, if there is a huge amount of data coming to the buffer, the eNB may notify the UE to use its full rate 5 bit CQI for feedback.

The above in-band signaling is quite efficient for quick recovery.

To further save network resources, the CQI transmission pattern is, in one embodiment, predefined and will be indexed by 1, 2, 3, 4, ... K, where K is a positive integer, and coded onto the layer 2 MAC optional header.

The process then proceeds to step 428 in which the traffic is passed to the UE.

Once the buffer is empty, the process proceeds back to step 414 in which it checks whether the buffer empty time exceeds the threshold.

As will be appreciated by those skilled in the art, the above embodiment of FIG. 4 can be modified to have incremental decreases in the CQI reporting rate. Specifically, if the buffer has been empty for an amount of time greater than a threshold, the eNB could signal to the UE to reduce the CQI reporting rate to a first value. If the buffer then is empty for an additional predetermined amount of time, the eNB could signal to the UE to use a second reporting rate. In this way, the reporting rate could be gradually decreased.

Figure 5:
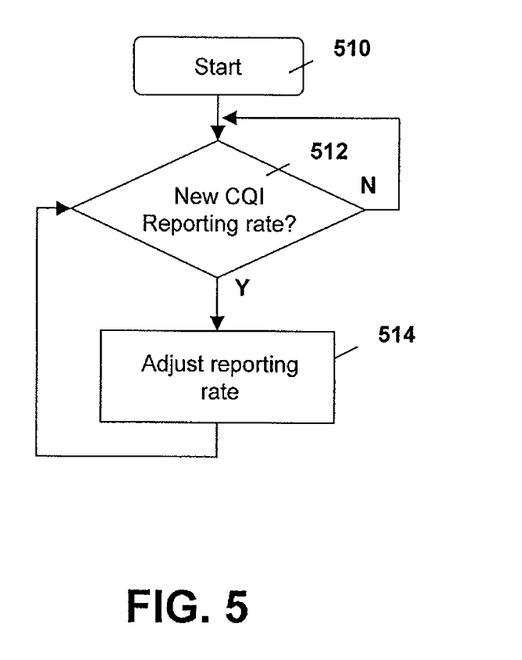
FIG. 5 is a flow diagram illustrating the UE side of the method of FIG. 4.

Reference is now made to FIG. 5. The process starts at step 510 and proceeds to step 512. From a UE perspective, the UE checks whether or not it has received explicit signaling to change its CQI reporting rate. This explicit signaling is found in the in-band MAC layer signaling and could, for example, be in the header of the MAC PDU.

From step 512, if a new CQI reporting rate has been received, the process proceeds to step 514 in which the UE adjusts the CQI reporting rate according to the value received in step 512. As will be appreciated, step 514 could also be used to indicate that only partial CQI information is necessary, and thus, to set the amount of information that is to be passed with each CQI report.

From step 514, the process proceeds back to step 512 in which the UE continues to monitor whether a new CQI reporting rate has been received.

As will be appreciated with reference to FIG. 5, the process can be used for both increasing and decreasing the CQI reporting rate. Thus, the UE can increase the CQI reporting rate when data is pending and decrease the CQI reporting rate when data transmission has finished, in response to signaling from the eNB.

As will be appreciated with reference to FIGS. 4 and 5, the eNB centric solution provides for the advantages of both battery life saving on the UE by reducing the CQI reporting rate and also releases the OFDM resource, thus saving network resources, which can be applied to other mobile devices. However, as will be appreciated, the signaling to notify the UE of the resource can create delays and the eNB centric solution also requires explicit signaling between the UE and the eNB.

Figure 6:
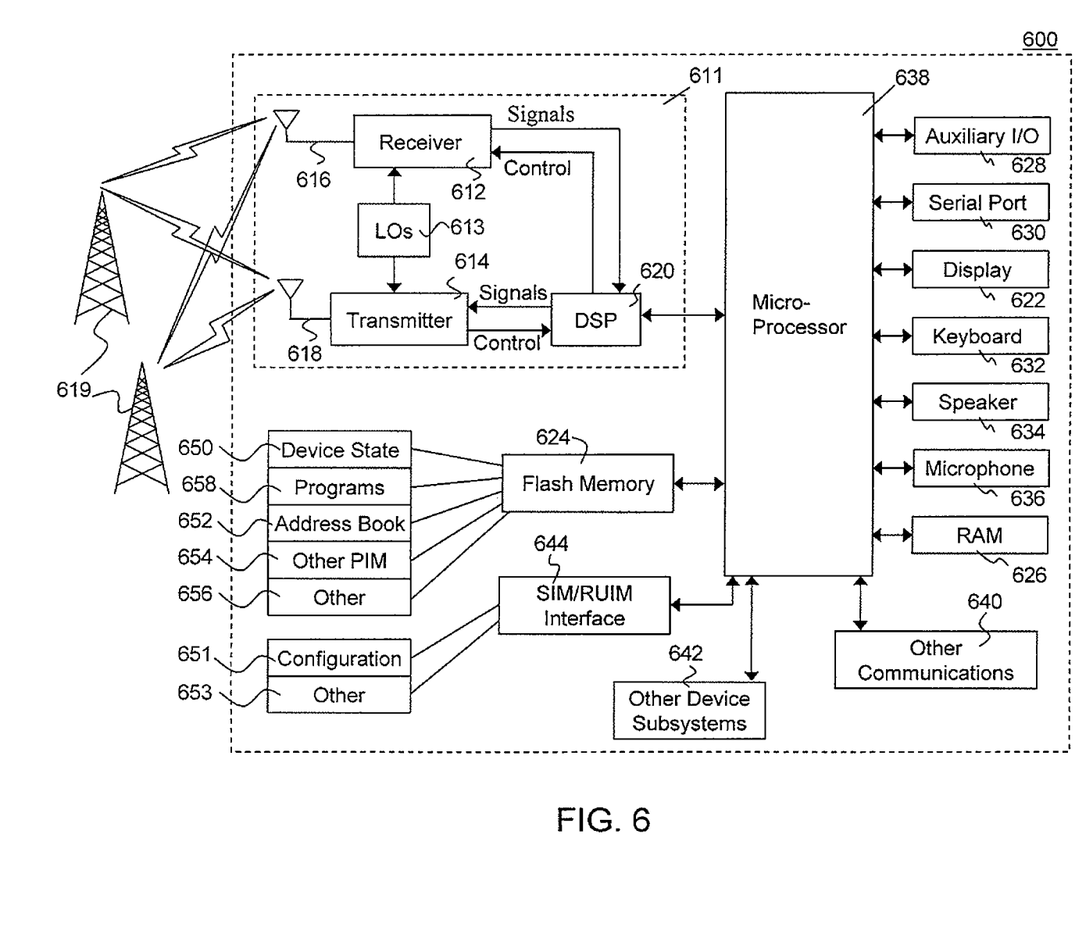
FIG. 6 is a block diagram of an exemplary mobile device for use with the present methods.

Reference is now made to FIG. 6. The above can be implemented on any mobile device. FIG. 6 illustrates an exemplary mobile device.

FIG. 6 is a block diagram illustrating user equipment apt to be used with preferred embodiments of the apparatus and method of the present application. User equipment 600 is preferably a two-way wireless communication device having at least voice and data communication capabilities. User equipment 600 preferably has the capability to communicate with other computer systems on the Internet.

User equipment 600 incorporates a communication subsystem 611, including both a receiver 612 and a transmitter 614, as well as associated components such as one or more, preferably embedded or internal, antenna elements 616 and 618, local oscillators (LOs) 613, and a processing module such as a digital signal processor (DSP) 620. As will be apparent to those skilled in the field of communications, the particular design of the communication subsystem 611 will be dependent upon the communication network in which the device is intended to operate.

An LTE user equipment may require a removable user identity module (RUIM) or a subscriber identity module (SIM) card in order to operate on a network. The SIM/RUIM interface 644 is normally similar to a card-slot into which a SIM/RUIM card can be inserted and ejected like a diskette or PCMCIA card. The SIM/RUIM card can have approximately 64K of memory and hold many key configuration 651, and other information 653 such as identification, and subscriber related information.

When required network registration or activation procedures have been completed, user equipment 600 may send and receive communication signals over a network 619. As illustrated in FIG. 6, network 619 can consist of multiple base stations communicating with the user equipment.

Signals received by antenna 616 through communication network 619 are input to receiver 612, which may perform such common receiver functions as signal amplification, frequency down conversion, filtering, channel selection and the like, and in the example system shown in FIG. 6, analog to digital (A/D) conversion. A/D conversion of a received signal allows more complex communication functions such as demodulation and decoding to be performed in the DSP 620. In a similar manner, signals to be transmitted are processed, including modulation and encoding for example, by DSP 620 and input to transmitter 614 for digital to analog conversion, frequency up conversion, filtering, amplification and transmission over the communication network 619 via antenna 618. DSP 620 not only processes communication signals, but also provides for receiver and transmitter control. For example, the gains applied to communication signals in receiver 612 and transmitter 614 may be adaptively controlled through automatic gain control algorithms implemented in DSP 620.

User equipment 600 preferably includes a microprocessor 638 which controls the overall operation of the device. Communication functions, including at least data and voice communications, are performed through communication subsystem 611. Microprocessor 638 also interacts with further device subsystems such as the display 622, flash memory 624, random access memory (RAM) 626, auxiliary input/output (I/O) subsystems 628, serial port 630, one or more keyboards or keypads 632, speaker 634, microphone 636, other communication subsystem 640 such as a short-range communications subsystem and any other device subsystems generally designated as 642. Serial port 630 could include a USB port or other port known to those in the art.

Some of the subsystems shown in FIG. 6 perform communication-related functions, whereas other subsystems may provide "resident" or on-device functions. Notably, some subsystems, such as keyboard 632 and display 622, for example, may be used for both communication-related functions, such as entering a text message for transmission over a communication network, and device-resident functions such as a calculator or task list.

Operating system software used by the microprocessor 638 is preferably stored in a persistent store such as flash memory 624, which may instead be a read-only memory (ROM) or similar storage element (not shown). Those skilled in the art will appreciate that the operating system, specific device applications, or parts thereof, may be temporarily loaded into a volatile memory such as RAM 626. Received communication signals may also be stored in RAM 626.

As shown, flash memory 624 can be segregated into different areas for both computer programs 658 and program data storage 650, 652, 654 and 656. These different storage types indicate that each program can allocate a portion of flash memory 624 for their own data storage requirements. Microprocessor 638, in addition to its operating system functions, preferably enables execution of software applications on the user equipment. A predetermined set of applications that control basic operations, including at least data and voice communication applications for example, will normally be installed on user equipment 600 during manufacturing. Other applications could be installed subsequently or dynamically.

A preferred software application may be a personal information manager (PIM) application having the ability to organize and manage data items relating to the user of the user equipment such as, but not limited to, e-mail, calendar events, voice mails, appointments, and task items. Naturally, one or more memory stores would be available on the user equipment to facilitate storage of PIM data items. Such PIM application would preferably have the ability to send and receive data items, via the wireless network 619. In a preferred embodiment, the PIM data items are seamlessly integrated, synchronized and updated, via the wireless network 619, with the user equipment user's corresponding data items stored or associated with a host computer system. Further applications may also be loaded onto the user equipment 600 through the network 619, an auxiliary I/O subsystem 628, serial port 630, short-range communications subsystem 640 or any other suitable subsystem 642, and installed by a user in the RAM 626 or preferably a non-volatile store (not shown) for execution by the microprocessor 638. Such flexibility in application installation increases the functionality of the device and may provide enhanced on-device functions, communication-related functions, or both. For example, secure communication applications may enable electronic commerce functions and other such financial transactions to be performed using the user equipment 600.

In a data communication mode, a received signal such as a text message or web page download will be processed by the communication subsystem 611 and input to the microprocessor 638, which preferably further processes the received signal for output to the display 622, or alternatively to an auxiliary I/O device 628.

A user of user equipment 600 may also compose data items such as email messages for example, using the keyboard 632, which is preferably a complete alphanumeric keyboard or telephone-type keypad, in conjunction with the display 622 and possibly an auxiliary I/O device 628. Such composed items may then be transmitted over a communication network through the communication subsystem 611.

For voice communications, overall operation of user equipment 600 is similar, except that received signals would preferably be output to a speaker 634 and signals for transmission would be generated by a microphone 636. Alternative voice or audio I/O subsystems, such as a voice message recording subsystem, may also be implemented on user equipment 600. Although voice or audio signal output is preferably accomplished primarily through the speaker 634, display 622 may also be used to provide an indication of the identity of a calling party, the duration of a voice call, or other voice call related information for example.

Serial port 630 in FIG. 6 would normally be implemented in a personal digital assistant (PDA)-type user equipment for which synchronization with a user's desktop computer (not shown) may be desirable, but is an optional device component. Such a port 630 would enable a user to set preferences through an external device or software application and would extend the capabilities of user equipment 600 by providing for information or software downloads to user equipment 600 other than through a wireless communication network. The alternate download path may for example be used to load an encryption key onto the device through a direct and thus reliable and trusted connection to thereby enable secure device communication. As will be appreciated by those skilled in the art, serial port 630 can further be used to connect the mobile device to a computer to act as a modem.

Other communications subsystems 640, such as a short-range communications subsystem, is a further optional component which may provide for communication between user equipment 600 and different systems or devices, which need not necessarily be similar devices. For example, the subsystem 640 may include an infrared device and associated circuits and components or a Bluetooth™ communication module to provide for communication with similarly enabled systems and devices.

Figure 7:
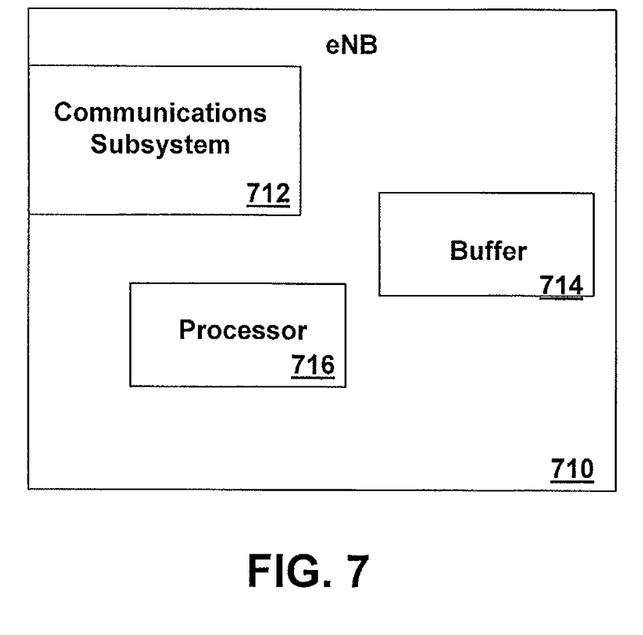
FIG. 7 is a simplified enhanced Node B for use in association with the present methods.

Referring to FIG. 7, a simplified enhanced Node B 710 is provided. Enhanced Node B 710 includes a communications subsystem 712 for signaling to user equipment and further for receiving data from a network.

Enhanced Node B further includes a buffer 714 to store data that is to be passed to a UE.

Enhanced Node B further includes a processor 716 adapted to track data in buffer 714 and further to initiate signaling in accordance with the embodiment of FIG. 4.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods

The invention claimed is:

1. A method, in a long term evolution architecture utilizing adaptive modulation and coding requiring periodic channel quality indication reports, the method comprising the steps of:
 determining, at an application layer in a protocol stack on the user equipment, that a data session has ended;
 upon said determining, providing an idle channel indication from the application layer; and
 upon detection of the idle channel indication, decreasing the rate of periodic channel quality indication reports.

2. The method of claim 1 further comprising the step of, prior to the decreasing of the rate of periodic channel quality indication reports, checking whether a maximum delay between channel quality indication reports has been reached, and if yes, skipping the decreasing step.

3. The method of claim 1, wherein the decreasing step replaces selected channel quality indication reports with discontinuous transmissions to decrease the rate of periodic channel quality indication reports.

4. The method of claim 1, wherein the decreasing step occurs immediately upon reception of the indication from the application layer in the protocol stack.

5. The method of claim 1, further comprising the step of restoring the channel quality indication reporting rate upon receipt of traffic.

6. The method of claim 5, further comprising signaling, from an enhanced node B to the user equipment, a channel quality indication reporting recovery.

7. The method of claim 6, wherein an initial packet is transmitted using a conservative modulation coding scheme.

8. The method of claim 6, wherein the channel quality indication reporting recovery notifies a user node to use less than a full rate channel quality indication reporting rate.

9. The method of claim 1, wherein the channel quality indication reporting utilizes partial channel quality indication information.

10. A user equipment for use in a long term evolution architecture utilizing adaptive modulation and coding requiring periodic channel quality indication reports, the user equipment comprising:
 a processor;
 a communications subsystem;
 wherein the processor and the communications subsystem cooperate to:
 determine, at an application layer in a protocol stack on the user equipment, that a data session has ended;
 upon said determining, provide an idle channel indication from the application layer; and
 decrease the rate of periodic channel quality indication reports upon detection of the idle channel indication.

11. The user equipment of claim 10 wherein the processor and the communications subsystem further cooperate to check whether a maximum delay between channel quality indication reports has been reached, and to skip the decreasing step if the maximum delay has been reached.

12. The user equipment of claim 10, wherein the processor and the communications subsystem further cooperate to replace selected channel quality indication reports with discontinuous transmissions to decrease the rate of periodic channel quality indication reports.

13. The user equipment of claim 10, wherein the processor and the communications subsystem further cooperate to immediately decrease the rate of periodic channel quality indication reports upon reception of the indication from the higher layer in the protocol stack.

14. The user equipment of claim 10, wherein the processor and the communications subsystem further cooperate to restore a full channel quality indication reporting rate upon receipt of traffic.

* * * * *